March 21, 1933. J. W. HOBBS 1,902,802
AUTOMOTIVE VEHICLE WITH RADIO EQUIPMENT
Filed Jan. 29, 1930
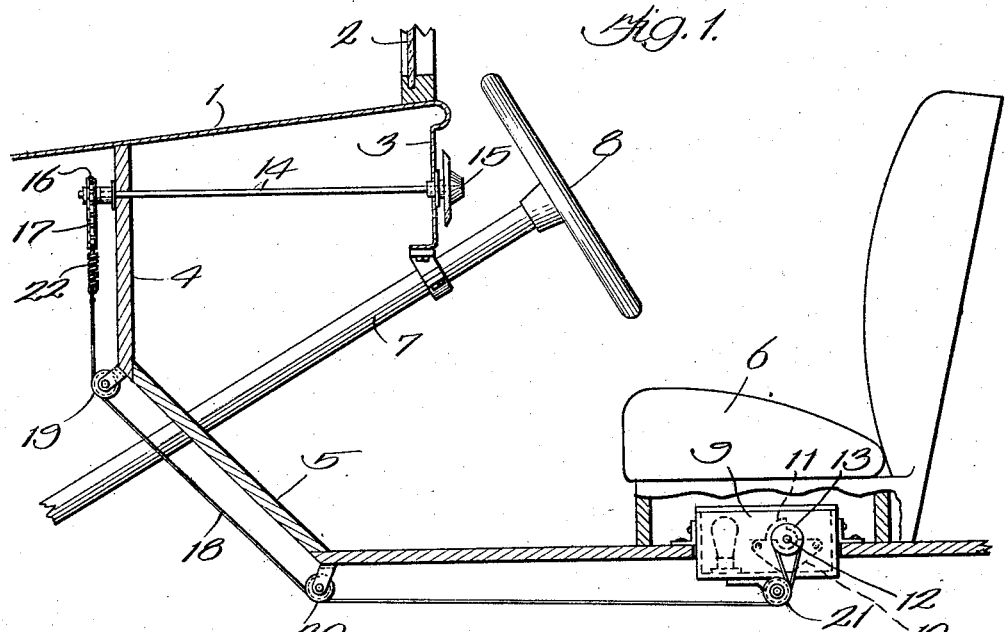
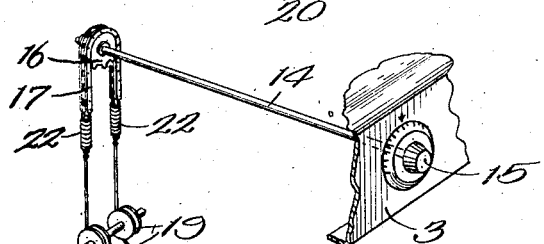
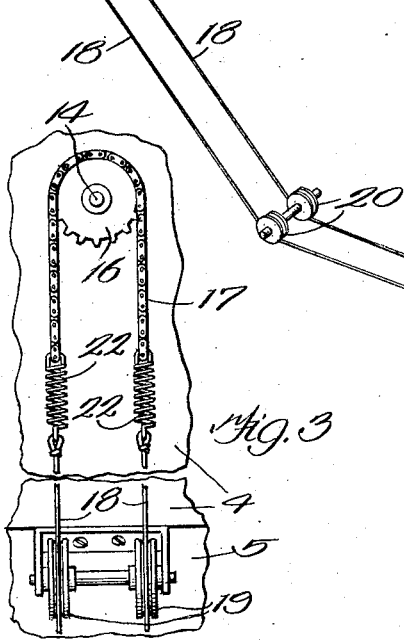
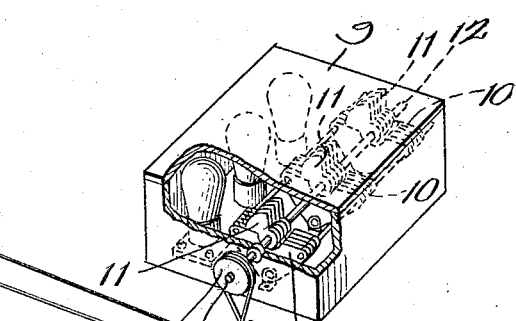
Inventor:
John W. Hobbs Patented Mar. 21, 1933

1,902,802

UNITED STATES PATENT OFFICE

JOHN W. HOBBS, OF ROCKFORD, ILLINOIS, ASSIGNOR TO MECHANICS UNIVERSAL JOINT COMPANY, OF ROCKFORD, ILLINOIS, A CORPORATION OF ILLINOIS

AUTOMOTIVE VEHICLE WITH RADIO EQUIPMENT

Application filed January 29, 1930. Serial No. 424,435.

My invention relates to automotive vehicles that are equipped with radio receiving sets and has for its general object the provision of inconspicuous and convenient locations for the radio receiving sets and the provision of means whereby the sets may be operated at the instrument board irrespective of the localities in which such sets are disposed. My invention is of service in connection with various forms of automotive vehicles and generally speaking resides in the provision of a motion transmitting means which is in turning relation to the tuning member of a radio receiving set, this motion transmitting means being inclusive of an actuating portion mounted upon the instrument board and passing through the dashboard and another portion operable by the first and connected therewith forwardly of the dashboard and passing beneath the floor of the vehicle into turning engagement with the tuning member of the receiving set. In the preferred embodiment of the invention the motion transmitting means is inclusive of a motion transmitting shaft mounted in the dashboard and instrument board and extending forwardly beyond the dashboard and accessible for operation at the instrument board, a driving pulley upon the forward end of said shaft, a driving pulley coupled with the tuning member of the radio receiving set and a belt passing beneath the floor of the automotive vehicle and over said pulleys. The belt is inclusive of two springs, one in each of its stretches, that serve to maintain said belt stretches taut, whereby movement of the aforesaid shaft is accurately communicated to the tuning member of the radio set.

I will explain my invention more fully by reference to the accompanying drawing in which Fig. 1 is a sectional elevation illustrating the preferred embodiment thereof; Fig. 2 is a perspective view of the arrangement illustrated in Fig. 1; and Fig. 3 is a view looking toward the rear and showing the motion transmitting mechanism where it is located at the front side of the dashboard.

The portion of the automotive vehicle illustrated is of a construction which is common in automobiles. It is inclusive of an engine hood portion 1, a windshield 2, an upright instrument board 3, a dashboard 4 forward of the instrument board and flooring 5 extending from the dashboard and beneath the seat 6. The usual steering column 7 is shown together with the steering hand wheel 8 at the upper end of the steering column. The radio receiving set is generally indicated at 9. It is inclusive of a tuning member comprising a plurality of condensers whose stators 10 are stationarily mounted within the radio receiving cabinet and whose rotors 11 are mounted upon a common shaft 12 which is suitably journaled upon the casing. This shaft is provided with a pulley 13 whereby it, together with the condenser rotors thereon, may be turned. A motion transmitting shaft 14 is mounted in the dashboard 4 and instrument board 3. It is provided with a dialing knob 15 which faces the seat 6 to be conveniently operable by an occupant of the seat. The shaft 14 extends forwardly beyond the dashboard where it carries a sprocket pulley 16. A belt passes over the pulleys 13 and 16 to turn the pulley 13 each time the knob 15 is turned. The belt is desirably inclusive of a sprocket chain 17 which is passed over the sprocket wheel. It is also inclusive of a cord or belt 18 which may be made of bronze braided wire. Idler pulleys 19, 20 and 21 are provided at and beneath the floor of the vehicle over which the belt 18 passes. Each stretch of said belt is inclusive of a coiled spring 22 which couples the belt portion 18 with the chain 17. There is thus a composite belt which is inclusive of two springs, one at each stretch of the belt, which are normally under tension to maintain the stretches of the belt taut and thereby eliminate lost motion between the shaft 14 and the pulley 13. The slightest tuning movement which is imparted to the knob 15 thus is assured of a counterpart in the tuning member of the receiving set. The receiving set is desirably received within an opening that is formed in the horizontal portion of the floor and beneath the seat 6. When the set is thus disposed it occupies no space that ordinarily might be desired for other use.

Changes may be made without departing from the invention.

Having thus described my invention, I claim:

1. The combination with an automotive vehicle having a dashboard and an instrument board at the rear of the dashboard; of a radio receiving set carried by the vehicle and which is inclusive of a tuning member that is mounted to turn; a motion transmitting shaft mounted in the dashboard and instrument board and extending forwardly beyond the dashboard and accessible for operation at the instrument board; a driving pulley upon the forward end of said shaft; a driving pulley coupled with the tuning member of the radio receiving set; and a belt passing beneath the floor of the automotive vehicle and over said pulleys, said belt being inclusive of two springs one in each of its stretches and serving to maintain said belt stretches taut whereby movement of the aforesaid shaft is accurately communicated to the tuning member of the radio set.

2. The combination with an automotive vehicle having a dashboard and an instrument board at the rear of the dashboard and a seat to the rear of the instrument board; of a radio receiving set carried by the vehicle beneath said seat and which is inclusive of a tuning member that is mounted to turn; a motion transmitting shaft mounted in the dashboard and instrument board and extending forwardly beyond the dashboard and accessible for operation at the instrument board; a driving pulley upon the forward end of said shaft; a driving pulley coupled with the tuning member of the radio receiving set; and a belt passing beneath the floor of the automotive vehicle and over said pulleys, said belt being inclusive of two springs one in each of its stretches and serving to maintain said belt stretches taut whereby movement of the aforesaid shaft is accurately communicated to the tuning member of the radio set.

In witness whereof, I hereunto subscribe my name.

JOHN W. HOBBS.